United States Patent
Tanaka et al.

(10) Patent No.: US 10,835,863 B2
(45) Date of Patent: Nov. 17, 2020

(54) $CO_2$ RECOVERY DEVICE AND $CO_2$ RECOVERY METHOD

(71) Applicant: MITSUBISHI HEAVY INDUSTRIES ENGINEERING LTD., Yokohama (JP)

(72) Inventors: Hiroshi Tanaka, Tokyo (JP); Takuya Hirata, Tokyo (JP); Atsuhiro Yukumoto, Tokyo (JP); Tsuyoshi Oishi, Tokyo (JP); Takahiko Endo, Tokyo (JP); Tatsuya Tsujiuchi, Tokyo (JP)

(73) Assignee: MITSUBISHI HEAVY INDUSTRIES ENGINEERING, LTD., Yokohama (JP)

( * ) Notice: Subject to any disclaimer, the term of this patent is extended or adjusted under 35 U.S.C. 154(b) by 0 days.

(21) Appl. No.: 16/217,175

(22) Filed: Dec. 12, 2018

(65) Prior Publication Data

US 2019/0111385 A1    Apr. 18, 2019

Related U.S. Application Data

(63) Continuation of application No. 15/505,313, filed as application No. PCT/JP2015/079935 on Oct. 23, 2015, now Pat. No. 10,201,781.

(30) Foreign Application Priority Data

Nov. 4, 2014    (JP) .................................. 2014-224255

(51) Int. Cl.
*B01D 53/14*    (2006.01)
*B01D 53/62*    (2006.01)
(Continued)

(52) U.S. Cl.
CPC ............. *B01D 53/62* (2013.01); *B01D 53/14* (2013.01); *B01D 53/1418* (2013.01);
(Continued)

(58) Field of Classification Search
CPC ...... B01D 2257/504; B01D 2258/0283; B01D 53/14; B01D 53/1418; B01D 53/1475;
(Continued)

(56) References Cited

U.S. PATENT DOCUMENTS

| 8,501,130 B1 | 8/2013 | Tsujiuchi et al. |
| 2003/0045756 A1 | 3/2003 | Mimura et al. |

(Continued)

FOREIGN PATENT DOCUMENTS

| EP | 2 644 255 A1 | 10/2013 |
| FR | 2 938 454 A1 | 5/2010 |

(Continued)

OTHER PUBLICATIONS

International Search Report w/English translation and Written Opinion in Japanese dated Dec. 8, 2015, issued in counterpart International Application No. PCT/JP2015/079935 (10 pages).

(Continued)

*Primary Examiner* — Cabrena Holecek
(74) *Attorney, Agent, or Firm* — Westerman, Hattori, Daniels & Adrian, LLP

(57) ABSTRACT

An absorption column is equipped with: a $CO_2$ absorption section absorbing $CO_2$ from $CO_2$-containing exhaust gas using a lean solution; a main rinse section recovering an entrained $CO_2$ absorbent using rinse water; a rinse water circulation line circulating a rinse water containing the $CO_2$ absorbent recovered in a liquid storage section of the main rinse section; a pre-rinse section provided between the $CO_2$ absorption section and the main rinse section; a rinse section extraction liquid supply line extracting a portion of the rinse water containing the $CO_2$ absorbent from the rinse water circulation line, and introducing the same into a reflux section of an absorption liquid regeneration tower; and a refluxed water supply line extracting a portion of refluxed (Continued)

water, introducing the same as pre-rinse water for the pre-rinse section, and connected on the pre-rinse section side.

3 Claims, 5 Drawing Sheets

(51) Int. Cl.
*B01D 53/73* (2006.01)
*B01D 53/78* (2006.01)
*B01D 53/79* (2006.01)
*B01D 53/96* (2006.01)
*F01K 23/10* (2006.01)
*F02C 6/18* (2006.01)

(52) U.S. Cl.
CPC ......... *B01D 53/1475* (2013.01); *B01D 53/73* (2013.01); *B01D 53/78* (2013.01); *B01D 53/79* (2013.01); *B01D 53/96* (2013.01); *F01K 23/105* (2013.01); *F02C 6/18* (2013.01); *B01D 2257/504* (2013.01); *B01D 2258/0283* (2013.01); *Y02A 50/20* (2018.01); *Y02C 20/40* (2020.08)

(58) Field of Classification Search
CPC ........ B01D 53/62; B01D 53/73; B01D 53/78; B01D 53/79; B01D 53/96; F01K 23/105; F02C 6/18; Y02A 50/2342; Y02C 10/06
See application file for complete search history.

(56) References Cited

U.S. PATENT DOCUMENTS

| | | | |
|---|---|---|---|
| 2011/0135550 A1 | 6/2011 | Nagayasu et al. | |
| 2013/0078171 A1* | 3/2013 | Lemarie | B01D 53/1475 423/223 |
| 2013/0205796 A1 | 8/2013 | Christensen et al. | |
| 2014/0150653 A1* | 6/2014 | Tsujiuchi | B01D 53/62 95/186 |
| 2015/0030516 A1 | 1/2015 | Higashi et al. | |
| 2015/0182906 A1 | 7/2015 | Tanaka et al. | |
| 2015/0241059 A1* | 8/2015 | Oishi | F23J 15/04 423/220 |

FOREIGN PATENT DOCUMENTS

| | | |
|---|---|---|
| JP | 59-26926 A | 2/1984 |
| JP | 08-080421 A | 3/1996 |
| JP | 2002-126439 A | 5/2002 |
| JP | 2011-115724 A | 6/2011 |
| JP | 2012-254390 A | 12/2012 |
| JP | 2013-59727 A | 4/2013 |
| JP | 2013-543100 A | 11/2013 |
| JP | 2014-33991 A | 2/2014 |
| WO | 2013/132789 A1 | 9/2013 |

OTHER PUBLICATIONS

English Translation of Written Opinion dated Dec. 8, 2015, issued in counterpart International Application No. PCT/JP2015/079935. (5 pages).

Extended (supplementary) European Search Report dated Aug. 17, 2017, issued in counterpart European Application No. 15856351.0. (8 pages).

Office Action dated Oct. 29, 2019, issued in counterpart JP Application No. 2018-211779, with English translation (8 pages).

\* cited by examiner

$CO_2$ RECOVERY DEVICE AND $CO_2$ RECOVERY METHOD

This application is a continuation of U.S. application Ser. No. 15/505,313 filed on Feb. 21, 2017, which is the National Stage of International Application No. PCT/JP2015/079935, filed on Oct. 23, 2015, which claims the benefit of priority of the prior Japanese Application No. 2014-224255 filed on Nov. 4, 2014, the entire contents of which are incorporated herein by reference.

TECHNICAL FIELD

The present invention relates to a $CO_2$ recovery device and a $CO_2$ recovery method that reduce the concentration of basic amine compounds released while remaining in a $CO_2$-removed flue gas that comes into contact with an absorption liquid with $CO_2$ removed therefrom.

BACKGROUND ART

As one of the causes of the global warming phenomenon, the greenhouse effect caused by $CO_2$ is pointed out, and countermeasures thereagainst have also been required internationally in order to protect the environment of earth. As generation sources of $CO_2$, in the fields of activity of all the human beings that combust fossil fuels, the requirement for suppression of emission of $CO_2$ tends to become stronger. Along with this, methods of bringing flue gas of boilers into contact with amine-based absorption liquids, such as aqueous amine compound solutions and removing and recovering $CO_2$ in the flue gas have been energetically studied for, for example, power generation facilities, such as thermoelectric power plants that use a large quantity of fossil fuels.

In a case where $CO_2$ is recovered from flue gas using such absorption liquids, amine compounds are entrained in $CO_2$-removed flue gas from which $CO_2$ has been recovered. Also, in order to prevent a situation in which air pollution caused by the amine compounds occurs, it is necessary to reduce the emission amount of the amine compounds emitted together with the $CO_2$-removed flue gas.

In the related art, PTL 1 discloses providing a plurality of rinse sections that bring rinse water into gas-liquid contact with $CO_2$-removed flue gas from which $CO_2$ has been absorbed and removed by gas-liquid contact with an absorption liquid, thereby recovering amine compounds entrained in the $CO_2$-removed flue gas, and sequentially performing recovery processing of amines entrained in the $CO_2$-removed flue gas in the plurality of rinse sections. As the rinse water of this PTL 1, condensed water separated by condensing moisture contained in $CO_2$ in the processing of removing $CO_2$ from the amine-based absorption liquid that has absorbed $CO_2$, and regenerating the amine-based absorption liquid is used.

Additionally, in the related art, PTL 2 discloses providing a cooling section that cools $CO_2$-removed flue gas from which $CO_2$ has been absorbed and removed by the gas-liquid contact with an absorption liquid, and a contacting section that brings condensed water condensed in the cooling section into countercurrent contact with the $CO_2$-removed flue gas. Moreover, PTL 2 discloses providing a rinse section that brings rinse water into gas-liquid contact with the $CO_2$-removed flue gas from which $CO_2$ has been absorbed and removed by gas-liquid contact with the absorption liquid, thereby recovering amine compounds entrained in the $CO_2$-removed flue gas, and condensed water that has been condensed in a cooling column that cools the flue gas before $CO_2$ is recovered and is used as rinse water.

CITATION LIST

Patent Literature

[PTL 1] Japanese Unexamined Patent Application Publication No. 2002-126439
[PTL 2] Japanese Unexamined Patent Application Publication No. 8-80421

SUMMARY OF INVENTION

Technical Problem

However, in recent years, it has been desired to further reduce the concentration of an absorption liquid component emitted while remaining in the $CO_2$-removed flue gas from a viewpoint of environmental preservation. Particularly, in a case where a $CO_2$ recovery device is installed with respect to flue gas from thermoelectric power plants or the like with a high processing gas flow rate expected in the future, since the emission amount of the flue gas is large, the emission amount of the absorption liquid component emitted while remaining in the $CO_2$-removed flue gas tends to increase, and it is required to further reduce the concentration of basic amine compounds (absorption liquid component) to be emitted.

The invention solves the above-described problems, and an object thereof is to provide a $CO_2$ recovery device and a $CO_2$ recovery method that can further reduce the concentration of basic amine compounds released while remaining in a $CO_2$-removed flue gas.

Solution to Problem

A first invention of the invention for solving the above problems is a $CO_2$ recovery device including a $CO_2$ absorption column that brings a $CO_2$-containing flue gas containing $CO_2$ into contact with a $CO_2$ absorption liquid and removes $CO_2$, and an absorption liquid regeneration column that regenerates the $CO_2$ absorption liquid that has absorbed the $CO_2$. A lean solution, from which $CO_2$ has been removed in the absorption liquid regeneration column, being reused in the $CO_2$ absorption column. The $CO_2$ absorption column includes a $CO_2$ absorption section that absorbs $CO_2$ in the $CO_2$-containing flue gas with the $CO_2$ absorption liquid, a main rinse section that is provided on a gas flow downstream side of the $CO_2$ absorption section, cools flue gas after $CO_2$ removal with rinse water, and recovers an entrained $CO_2$ absorbent with the rinse water, a rinse water circulation line that supplies and circulates the rinse water containing the $CO_2$ absorbent recovered in a liquid storage section of the main rinse section from a top part side of the main rinse section, a pre-rinse section that is provided between the $CO_2$ absorption section and the main rinse section, a rinse section extraction liquid supply line that extracts a portion of the rinse water containing the $CO_2$ absorbent from the rinse water circulation line, is connected to a top part side of a reflux section, of the absorption liquid regeneration column, and introduces the portion of the rinse water into the reflux section, and a refluxed water supply line that extracts a portion of refluxed water from a side closer to a column bottom part than an introduction position of the reflux section, is connected to the pre-rinse section side, and introduces the portion of the refluxed water as pre-rinse water of the pre-rinse section.

A second invention is the $CO_2$ recovery device based on the first invention in which the pre-rinse section includes a pre-rinse water circulation line that supplies and circulates pre-rinse water from a top part side of the pre-rinse section, the refluxed water supply line is connected to the pre-rinse water circulation line, and a portion of the refluxed water is introduced as the pre-rinse water.

A third invention is the $CO_2$ recovery device based on the first or second, further including a deep rinse section that is provided on a gas flow downstream side of the main rinse section, and performs deep rinsing of the flue gas after $CO_2$ removal after main rinsing with rinse water supplied from the outside.

A fourth invention is a $CO_2$ recovery method of circulating and reusing a lean solution, from which $CO_2$ has been removed in an absorption liquid regeneration column, in a $CO_2$ absorption column, using the $CO_2$ absorption column that brings a $CO_2$-containing flue gas containing $CO_2$ into contact with a $CO_2$ absorption liquid and removes $CO_2$; and an absorption liquid regeneration column that separates $CO_2$ absorption liquid and regenerates the $CO_2$ absorption liquid that has absorbed the $CO_2$. The method includes pre-rinsing the $CO_2$-removed flue gas is performed using pre-rinse water extracted from a portion of reflux section obtained by a portion of rinse water used for the main rinsing being extracted, introduced into a reflux section of the absorption liquid regeneration column, and mixed with high-temperature refluxed water in the reflux section when main rinsing of $CO_2$-removed flue gas is performed with rinse water on a downstream side of the $CO_2$ absorption column, and pre-rinsing of the $CO_2$-removed flue gas after $CO_2$ recovery is performed on an upstream side where the main rinsing is performed.

A fifth invention is the $CO_2$ recovery method based on the fourth invention in which deep rinsing is performed with deep rinsing water supplied from the outside of a rinse section on a downstream side of the main rinse section.

Advantageous Effects of Invention

According to the invention, the concentration of basic amine compounds of the absorption liquid released while remaining in the $CO_2$-removed flue gas can be further reduced, and the recovered absorption liquid can be reused.

DESCRIPTION OF EMBODIMENTS

Preferred embodiments of the invention will be described below in detail with reference to the entrained drawings. In addition, the invention is not limited by the embodiments and includes those configured by combining respective embodiments in a case where there are a plurality of embodiments.

Embodiment 1

Figure 1:
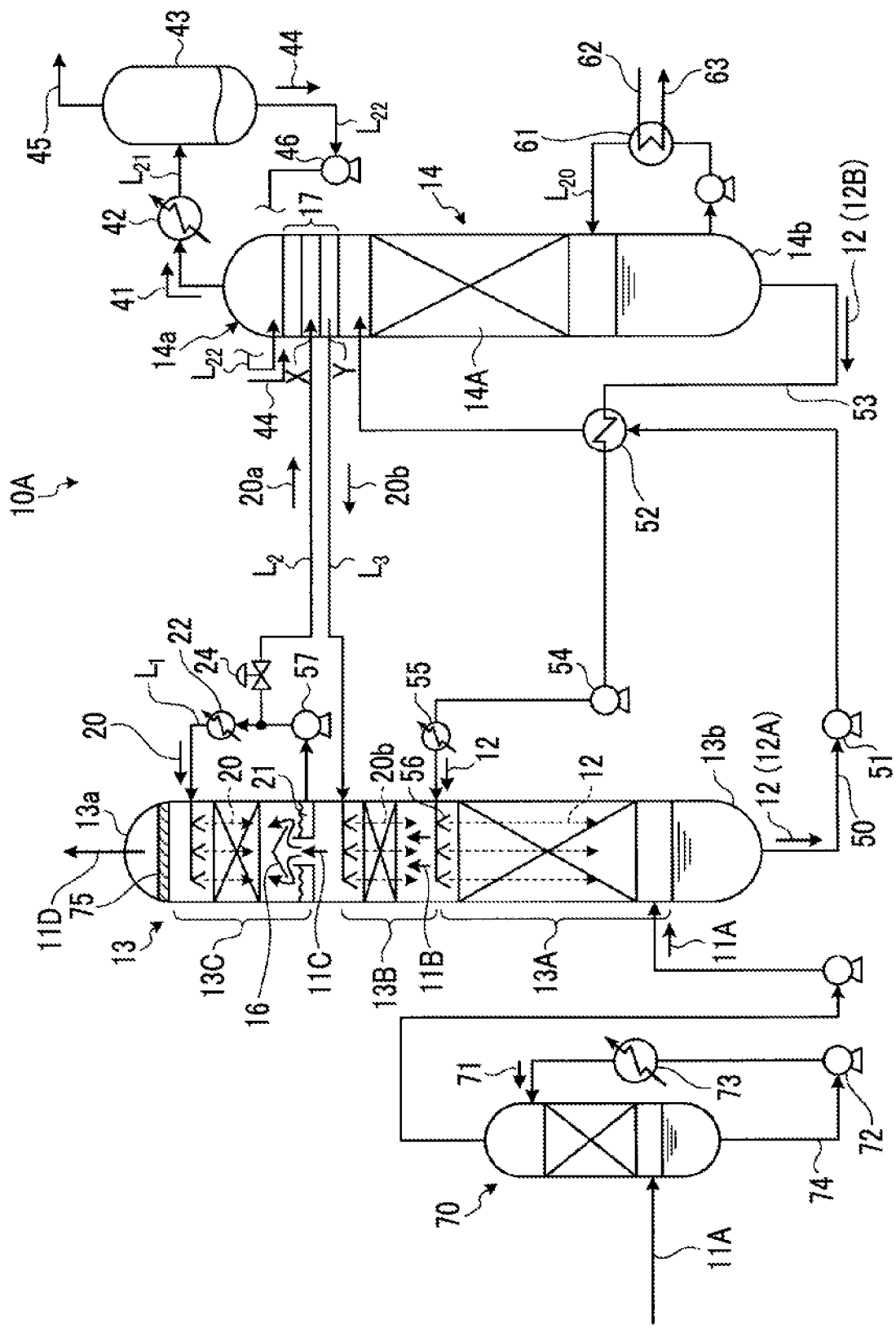
FIG. 1 is a schematic view of a $CO_2$ recovery device according to Embodiment 1.

A $CO_2$ recovery device according to an example according to the invention will be described with reference to the drawings. FIG. 1 is a schematic view of the $CO_2$ recovery device according to Embodiment 1.

As illustrated in FIG. 1, a $CO_2$ recovery device 10A according to the present embodiment is a $CO_2$ recovery device that includes a $CO_2$ absorption column (hereinafter referred to as an "absorption column") 13 that brings a $CO_2$-containing flue gas 11A containing $CO_2$ into contact with a $CO_2$ absorption liquid (lean solution 12B) and removes $CO_2$, and an absorption liquid regeneration column (hereinafter referred to as a "regeneration column") 14 that regenerates the $CO_2$ absorption liquid (rich solution 12A) that has absorbed the $CO_2$. The lean solution 12B, from which $CO_2$ has been removed in the regeneration column 14, is reused in the $CO_2$ absorption column 13. The absorption column 13 includes a $CO_2$ absorption section 13A that absorbs $CO_2$ in the $CO_2$-containing flue gas 11A with the $CO_2$ absorption liquid (lean solution) 12B, a main rinse section 13C that is provided on a gas flow downstream side of the $CO_2$ absorption section 13A, cools the flue gas 11B after $CO_2$ removal with rinse water 20, and recovers an entrained $CO_2$ absorbent with the rinse water 20, a rinse water circulation line $L_1$ that supplies and circulates the rinse water 20 containing the $CO_2$ absorbent recovered in a liquid storage section 21 of the main rinse section 13C from a top part side of the main rinse section 13C, a pre-rinse section 13B that is provided between the $CO_2$ absorption section 13A and the main rinse section 13C, a rinse section extraction liquid supply line $L_2$ that extracts a portion 20a of the rinse water 20 containing the $CO_2$ absorbent from the rinse water circulation line $L_1$, is connected to a top part side of a reflux section 17 of the absorption liquid regeneration column 14, and introduces the portion 20a of the rinse water 20 into the reflux section 17, and a refluxed water supply line $L_3$ that extracts a portion of refluxed water from a side closer to a column bottom part than an introduction position of the reflux section 17, is connected to the pre-rinse section 13B side, and introduces the portion of the refluxed water as pre-rinse water 20b of the pre-rinse section 13B.

In addition, in the present embodiment, the portion 20a of the rinse water 20 containing the $CO_2$ absorption liquid is extracted as it is from the rinse water circulation line $L_1$. However, the invention is not limited to this. A storage part that temporarily stores the portion 20a of the rinse water 20 containing the $CO_2$ absorption liquid may be provided separately from the rinse water circulation line $L_1$ such that the portion 20a is extracted from this storage part.

The $CO_2$ recovery device 10A of the present embodiment has the absorption column 13 that brings the $CO_2$-containing flue gas 11A containing $CO_2$ into contact with the lean solution 12B and removes $CO_2$, and the regeneration column 14 that regenerates the rich solution 12A that has absorbed $CO_2$, and efficiently removes $CO_2$ from the $CO_2$-containing flue gas 11A containing $CO_2$, circulating and reusing the lean solution 12B, from which the $CO_2$ has been removed in the regeneration column 14, in the $CO_2$ absorption column 13.

The $CO_2$ absorption column 13 of the present embodiment includes the $CO_2$ absorption section 13A that absorbs $CO_2$ in the $CO_2$-containing flue gas 11A, the pre-rinse section 13B that is provided on the gas flow downstream side of the $CO_2$ absorption section 13A, and performs pre-rinsing of the flue gas 11B after $CO_2$ removal, and the main rinse section 13C that performs main rinsing of flue gas 11C after $CO_2$ removal after the pre-rinsing.

Here, inside the $CO_2$ absorption column 13, the $CO_2$-containing flue gas 11A introduced from the outside in the absorption column bottom part 13b is brought into counter-current contact with the $CO_2$ absorption liquid 12 having a $CO_2$ absorbent, such as alkanolamine, as a base, in the $CO_2$ absorption section 13A provided on a lower part side of the $CO_2$ absorption column 13. The, as a result of this counter-current contact, $CO_2$ in the $CO_2$-containing flue gas 11A is absorbed into the $CO_2$ absorption liquid 12 by a chemical reaction ($R-NH_2+H_2O+CO_2 \rightarrow R-NH_3HCO_3$). As a result, $CO_2$ hardly remains in the flue gas 11B after $CO_2$ removal that passes through the $CO_2$ absorption section 13A and rises inside the $CO_2$ absorption column 13.

The flue gas 11B after $CO_2$ removal is rinsed by the main rinse section 13C on the gas flow downstream side. However, in the present embodiment, before the flue gas is introduced into this main rinse section 13C, the pre-rinse section 13B is provided, and the pre-rinsing is performed in the pre-rinse section.

In the pre-rinse section 13B, the flue gas 11B after $CO_2$ removal is brought into gas-liquid contact with the pre-rinse water 20b and is pre-rinsed, and the $CO_2$ absorbent entrained in the flue gas 11B after $CO_2$ removal is rinsed.

Here, the reason why the $CO_2$ absorbent in the $CO_2$ absorption liquid 12 is entrained in the flue gas 11B after $CO_2$ removal will be described. Water vapor is entrained in the $CO_2$-containing flue gas 11A that rises inside the $CO_2$ absorption section 13A within the absorption column 13, from a relationship of a saturated water vapor pressure at the temperature of the flue gas.

When the flue gas 11B after $CO_2$ removal containing this water vapor is brought into counter-current contact with the $CO_2$ absorption liquid 12, an extremely small portion of the $CO_2$ absorbent is entrained in the flue gas 11B after $CO_2$ removal as mist through entrainment, as water vapor from the relationship of the saturated water vapor pressure.

As a result, the a $CO_2$ absorbent is slightly included in the flue gas 11B after $CO_2$ removal that has passed through the $CO_2$ absorption section 13A.

Additionally, in the main rinse section 13C, when the rinse water 20 that is condensed water is produced from the water vapor entrained in the flue gas 11B through the cooling of the flue gas 11B after $CO_2$ removal, and the entrained $CO_2$ absorbent is dissolved in the flue gas 11B, the $CO_2$ absorbent is slightly included in the rinse water 20.

Therefore, in the present embodiment, first, in the pre-rinse section 13B, the $CO_2$ absorbent in the flue gas 11B after $CO_2$ removal is rinsed and removed in the pre-rinse water 20b.

The flue gas 11C after $CO_2$ removal after having passed through the pre-rinse section 13B rises to the main rinse section 13C side via a chimney tray 16, comes into gas-liquid contact with the rinse water 20 supplied from the top part side of the main rinse section 13C, and recovers the $CO_2$ absorbent entrained in the flue gas 11C after $CO_2$ removal through circulation rinsing.

In the main rinse section 13C, the rinse water 20 stored in the liquid storage section 21 of the chimney tray 16 is circulated in the rinse water circulation line $L_1$ so as to perform circulation rinsing. In addition, a cooling section 22 is provided in the rinse water circulation line $L_1$, and performs cooling to a predetermined temperature (for example, 40° C. or lower). The rinse water 20 is circulated by a circulation pump 57 provided in the rinse water circulation line $L_1$. The $CO_2$ absorbent entrained in the flue gas 11C after $CO_2$ removal can be further recovered and removed by the main rinsing using this circulating rinse water 20.

Thereafter, flue gas 11D after $CO_2$ removal from which the $CO_2$ absorbent has been removed is released from a column top part 13a of the $CO_2$ absorption column 13 to the outside. In addition, reference sign 75 represents a mist eliminator that traps mist in gas.

In this way, in the present embodiment, the pre-rinse section 13B and the main rinse section 13C are provided, and the $CO_2$ absorption liquid dissolved in the condensed water entrained in the flue gases 11B and 11C after $CO_2$ removal is rinsed and removed in two steps. Thus, the $CO_2$ absorption liquid entrained in the flue gases 11B and 11C after $CO_2$ removal can be reliably recovered and removed.

As a result, the concentration of a $CO_2$ absorbent, such as basic amine compounds released while remaining in the flue gas 11D after $CO_2$ removal released to the outside, can be further reduced.

The rich solution 12A that has absorbed $CO_2$ is raised in pressure by a rich solvent pump 51 interposed in a rich solution supply pipe 50, is heated in a rich/lean solution heat exchanger 52 with the lean solution 12B regenerated in the absorption liquid regeneration column 14, and is supplied to a top part side of the absorption liquid regeneration column 14.

The rich solution 12A released from the top part side of the regeneration column 14 to the inside of the column releases most of $CO_2$ in a $CO_2$ release part 14A through heating using the steam from a column bottom part 14b. The $CO_2$ absorption liquid 12 that released a portion or most of $CO_2$ within the regeneration column 14 is referred to as "semi-lean solution". This semi-lean solution that is not illustrated becomes the lean solution 12B from which substantially all $CO_2$ has been removed when flowing down to a bottom part of the regeneration column 14. The lean solution 12B is heated with saturated steam 62 in a regenerative heater 61 interposed in a circulation line $L_{20}$. The saturated steam 62 after heating becomes steam condensed water 63.

Meanwhile, $CO_2$ gas 41 that has entrained the water vapor dissipated from the rich solution 12A and the semi-lean solution (not illustrated) inside the column is released from a column top part 14a of the regeneration column 14. Then, the $CO_2$ gas 41 which has entrained the water vapor is led out by a gas release line $L_{21}$, and the water vapor is condensed by a condenser 42 interposed in the gas release line $L_{21}$, condensed water 44 is separated by a separation drum 43, $CO_2$ gas 45 is emitted to the outside of the system, and post-processing, such as compression recovery, is separately performed. The condensed water 44 separated in the separation drum 43 is supplied to an upper part of the absorption liquid regeneration column 14 by a condensed water circulation pump 46 interposed in a condensed water line $L_{22}$. In addition, although not illustrated, a portion of the condensed water 44 may be supplied to the rinse water circulation line $L_1$ of the rinse water 20 containing the $CO_2$ absorption liquid, and may be used for absorption of the $CO_2$ absorption liquid 12 entrained in the flue gas 11C after $CO_2$ removal.

The regenerated $CO_2$ absorption liquid (lean solution 12B) is sent to the $CO_2$ absorption column 13 side by a lean solution pump 54 via a lean solution supply pipe 53, and is circulated and used as the $CO_2$ absorption liquid 12. In this case, the lean solution 12B is cooled up to a predetermined temperature by the cooling section 55, and is supplied into the $CO_2$ absorption section 13A via a nozzle 56.

Therefore, the $CO_2$ absorption liquid 12 forms a closed path that circulates through the $CO_2$ absorption column 13 and the absorption liquid regeneration column 14, and is reused in the $CO_2$ absorption section 13A of the $CO_2$ absorption column 13. In addition, the $CO_2$ absorption liquid 12 is supplied by a supply line (not illustrated) if necessary, and the $CO_2$ absorption liquid is regenerated by a reclaimer (not illustrated) if necessary.

In addition, the $CO_2$-containing flue gas 11A supplied to the $CO_2$ absorption column 13 is cooled with cooling water 71 in a cooling column 70 provided on the upstream side of the $CO_2$ absorption column, and is introduced into the $CO_2$ absorption column 13 after that. In addition, a portion of the cooling water 71 may also be supplied to a top part of the main rinse section 13C as the rinse water 20 of the $CO_2$ absorption column 13, and may be used for rinsing of the $CO_2$ absorption liquid 12 entrained in the flue gas 11B after $CO_2$ removal. In addition, reference sign 72 represents a circulation pump, 73 represents a cooler, and 74 represents a circulation line.

In the present embodiment, the portion 20a of the rinse water 20 used in the main rinse section 13C is introduced into the reflux section 17 of the regeneration column 14, and a portion of refluxed water extracted from this reflux section 17 is used as the rinse water to be used in the pre-rinse section 13B within the absorption column 13.

Here, in the present embodiment, the portion 20a of the rinse water 20 containing the $CO_2$ absorbent is extracted from the rinse water circulation line $L_1$ of the main rinse section 13C by the rinse section extraction liquid supply line $L_2$. The rinse section extraction liquid supply line $L_2$ is connected to an introduction position X on the column top part 14a side of the reflux section 17 of the absorption liquid regeneration column 14, and the portion 20a of the rinse water 20 containing the $CO_2$ absorbent is introduced into the reflux section 17 at this introduction position. In addition, the extraction amount of the portion 20a of the rinse water 20 is adjusted by an adjusting valve 24 interposed in the rinse section extraction liquid supply line $L_2$. The rinse section extraction liquid supply line $L_2$ is branched from the rinse water circulation line $L_1$ and directly connected only to the reflux section 17 of the absorption liquid regeneration column 14.

Then, in the reflux section 17, the condensed water is introduced, becomes refluxed water, and is mixed with this refluxed water. Then, a portion of the refluxed water is extracted from a position Y closer to the column bottom part 14b than the introduction position X of the portion 20a of the rinse water 20 containing the $CO_2$ absorbent by the refluxed water supply line $L_3$. Then, the refluxed water is introduced as the pre-rinse water 20b of the pre-rinse section 13B by the refluxed water supply line $L_3$ connected to the pre-rinse section 13B side.

Figure 2:
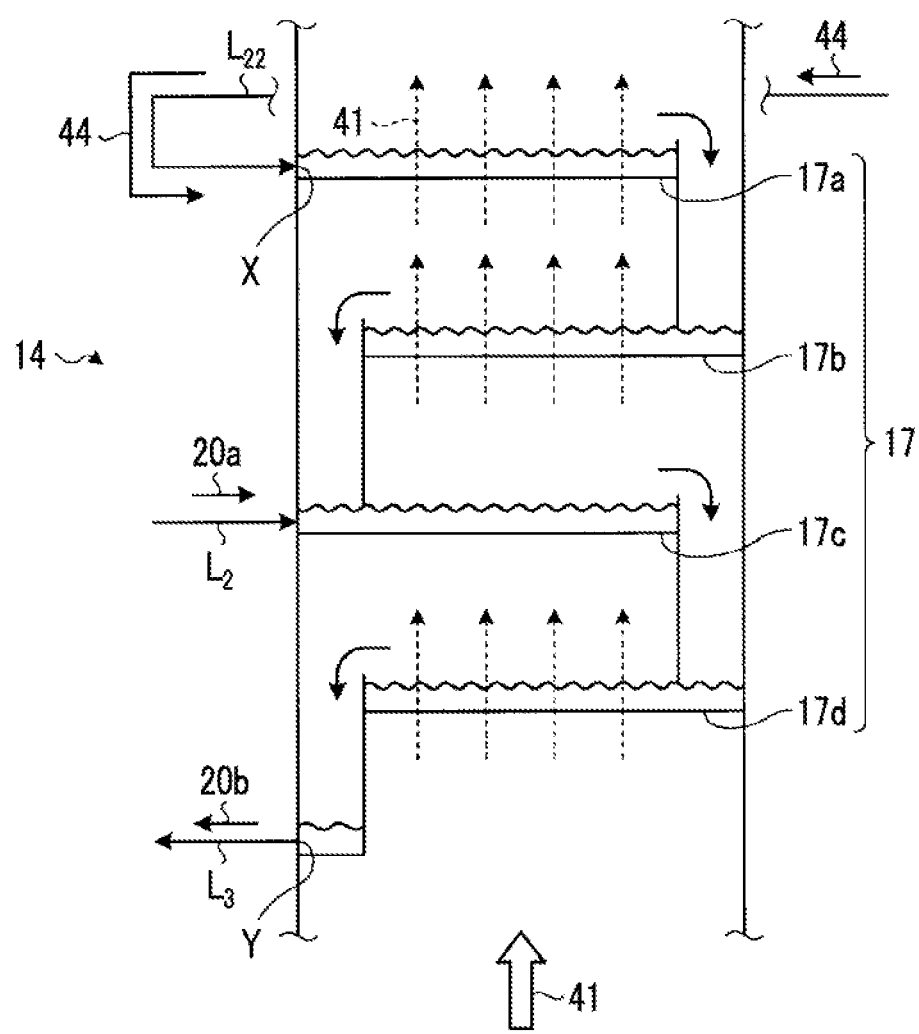
FIG. 2 is a schematic view of main sections of an absorption liquid regeneration column according to Embodiment 1.

FIG. 2 is a schematic view of the main sections of the absorption liquid regeneration column according to Embodiment 1.

As illustrated in FIG. 2, in the reflux section 17 of the regeneration column 14, a plurality of stage trays 17a to 17d are arranged, and the $CO_2$ gas 41, which has entrained the water vapor after $CO_2$ is released in the $CO_2$ release part 14A of the regeneration column 14, is raised.

That is, as illustrated in FIG. 2, in the reflux section 17 of the regeneration column 14, the refluxed water generated by the $CO_2$ gas 41 that has entrained the water vapor from a lower part of the regeneration column 14 in the reflux section 17, and the portion 20a of the rinse water 20 containing the $CO_2$ absorbent are mixed with each other when fall from the shelf stage trays 17a to 17d.

In the reflux section 17, the portion 20a of the rinse water 20 rises in temperature, is then extracted as a portion of the refluxed water from the extraction position Y closer to the column bottom part 14b side than the portion 20a of the introduction position X of the rinse water 20, and is used as the pre-rinse water 20b of the pre-rinse section 13B.

Here, the regeneration column reflux section may be a plate column or a packed column. In addition, it is preferable to adopt the plate column under the condition of a low liquid flow rate.

As specific examples of this plate column, for example, a valve tray, a bubble cap tray, a porous plate tray, and the like of a cross current contact type having a downcomer can be exemplified.

In the present embodiment, it is preferable that the number of stages of the reflux section 17 are four or more stages from a viewpoint of gas-liquid contact efficiency. In addition, a cross current contact type four-stage tray is illustrated in Example of FIG. 2.

Although there is no particular limitation to a method of supplying the liquid from the outside of the column, in the present embodiment, an aspect in which liquid supply is supplied by the condensed water 44 of the downcomer, and the rinse section extraction liquid supply line $L_2$ from an opposite direction is exemplified.

The liquid supply from an upper stage tray 17a to a lower stage tray 17b may be performed by a method of making a liquid flow down inside the column in a downcomer part or a method of supplying a liquid to a lower stage via a pipe outside the column from the downcomer part. In addition, the embodiment illustrated in FIG. 2 is an example of liquid supply to a lower stage inside the column.

As for the moisture condensation of the reflux section 17, gas temperature falls to, for example, about 5° C., due to the contact of the $CO_2$ gas 41 containing water vapor at a temperature of about 100° C. with the reflux liquid and a rinse section extraction supply liquid at a low temperature, in a lowest stage tray 17d of the reflux section 17. As a result, the water vapor in the $CO_2$ gas 41 containing the water vapor is condensed. Therefore, as compared to a rinse section extraction liquid supply amount (with no supply to the reflux section) as in the related art, in the present embodiment, for example, a liquid flow rate of about 1.6 times is obtained by supplying the portion 20a of the rinse water 20 to the reflux section 17, and the condensation.

In this case, the concentration of the absorbent in the rinse section extraction liquid falls to, for example, about 0.6 times as compared to the related art, and an extraction liquid temperature ($T_1$) of a portion of the refluxed water from the reflux section 17 rises to, for example, about 36° C. higher than an introduction temperature ($T_0$) of the portion 20a of the rinse water 20 containing the $CO_2$ absorbent introduced into the reflux section 17.

Since a partial extraction liquid of the refluxed water from the reflux section 17 of which the temperature has risen is introduced into the pre-rinse section 13B as the pre-rinse water 20b, pre-rinsing efficiency increases as compared to the related art.

In the pre-rinse section 13B, in the desorption of the absorbent from the absorption liquid mist entrained in the flue gas 11B after $CO_2$ removal, an equilibrium point is the concentration of the absorbent in the rinse section rinse water. If the absorbent in the rinse water has low concentration as in the present embodiment, a difference from the concentration of the absorbent in the mist is large, and the desorption of the $CO_2$ absorbent from the mist is markedly promoted compared to the related art.

Moreover, since the liquid temperature of the pre-rinse water 20b introduced into the pre-rinse section 13B is high as in the present embodiment, not only a driving force of the above absorbent concentration difference in the liquid (absorbent equilibrium pressure difference) but also a mass transfer coefficient rises. Therefore, an absorbent desorption rate expressed by the product of the mass transfer coefficient and the driving force is markedly improved compared to the related art.

Additionally, since a total amount of the portion 20a of the rinse water 20 is not supplied to the column bottom part 14b of the regeneration column 14, the reboiler amount of the regenerative heater 61 can be reduced.

In this way, the $CO_2$ absorption liquid 12 that is used to circulate through the $CO_2$ absorption column 13 and the absorption liquid regeneration column 14 is prevented from being released to the outside of the absorption column 13 by bringing the flue gases 11B and 11C after $CO_2$ removal into counter-current contact with the rinse water 20, thereby absorbing and removing the $CO_2$ absorption liquid 12 entrained in the $CO_2$-removed flue gases 11B and 11C with the rinse water 20, in the pre-rinse section 13B and the main rinse section 13C.

In this rinsing, a portion of the refluxed water, of which the liquid temperature is raised and the concentration of the absorbent is lowered by the portion 20a of the rinse water 20 used in the main rinse section 13C being extracted, introduced into the reflux section 17 on the regeneration column 14 side, and mixed with high-temperature refluxed water in the reflux section 17, is used as the pre-rinse water 20b to be used in the pre-rinse section 13B. Thus, efficient recovery of the absorbent resulting from by promotion of the diffusion of the absorbent from the mist on the basis of higher temperature of the pre-rinse water 20b and lower concentration of the contained absorbent in the pre-rinse section 13B can be achieved, and the amount of diffusion of the absorbent entrained in the gases can be reduced.

Test Example 1

A test in which the effects of Embodiment 1 of the invention were confirmed was performed.

That is, carbon dioxide was removed by supplying 200 Nm³/h of combustion flue gas containing 14% of carbon dioxide to the $CO_2$ absorption section 13A of the absorption column 13, and brining the combustion flue gas into countercurrent contact with a basic amine solution ($CO_2$ absorption liquid). In the present test example the pre-rinse section 13B was provided on a downstream (upper part) side of the $CO_2$ absorption section 13A. As the pre-rinse water 20b of the pre-rinse section 13B, there was used one obtained by the portion 20a of the rinse water 20 used in the main rinse section 13C being extracted, introduced into the reflux section 17 on the regeneration column 14 side, mixed with the high-temperature refluxed water in the reflux section 17, and extracted therefrom. The pre-rinse water 20b and the flue gas 11B after $CO_2$ removal were brought into countercurrent contact with each other, were made to flow down directly to the $CO_2$ absorption liquid of the $CO_2$ absorption section 13A, were brought into countercurrent contact with the rinse water in a liquid/gas ratio of 4 L/Nm³ in the main rinse section 13C, and were passed through a mist eliminator 75 at an outlet.

Figure 5:
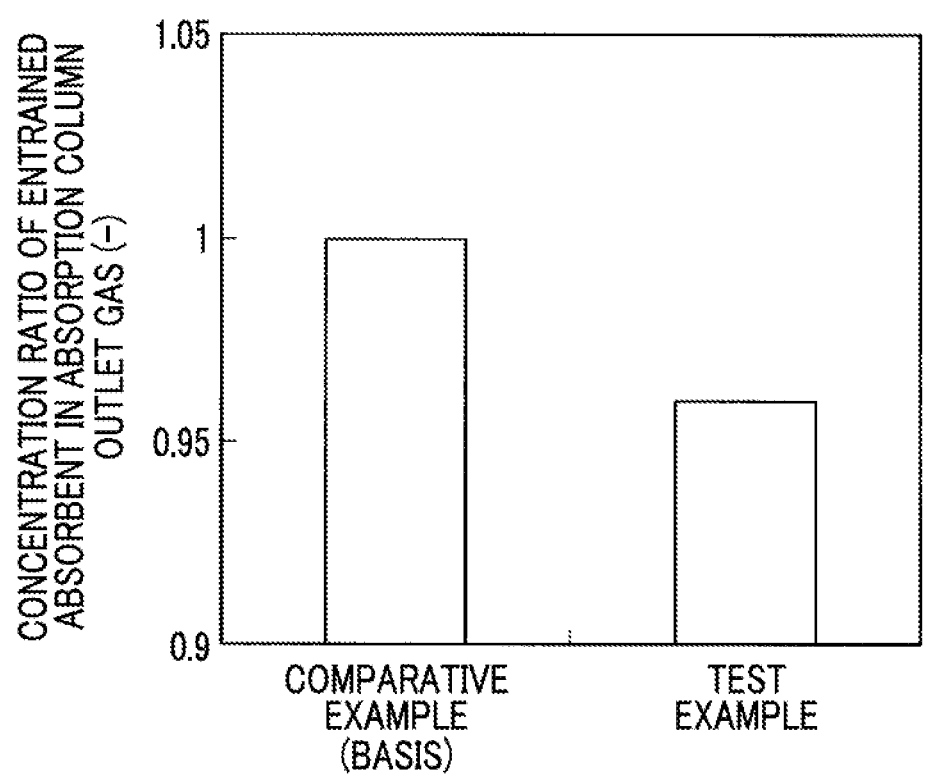
FIG. 5 is a graph of a concentration ratio of an entrained absorbent in an absorption column outlet gas in a test example.

The results are illustrated in FIG. 5. FIG. 5 is a graph in which the concentrations of entrained substances in absorption column outlet gases in Test Example 1 are contrasted. In FIG. 5, the left side represents a related-art method that is a case where a portion of the rinse water 20 was supplied as it is from the main rinse section to the pre-rinse section. In contrast, the right side represents a case where high-temperature diluted pre-rinse water 20b obtained by the portion 20a of the rinse water 20 used in the main rinse section 13C being extracted, introduced into the reflux section 17 on the regeneration column 14, mixed with the high-temperature refluxed water in the reflux section 17, and extracted therefrom was used for the pre-rinse section 13B according to the present embodiment. In a case where the high-temperature diluted pre-rinse water 20b was used for the pre-rinse section 13B as in the test example, the concentration ratio of an entrained substance in the absorption column outlet gas ($CO_2$ absorption liquid-removed flue gas 11D) was reduced to 0.96 in the present test example if the concentration ratio was set to 1 in the related art.

Embodiment 2

Figure 3:
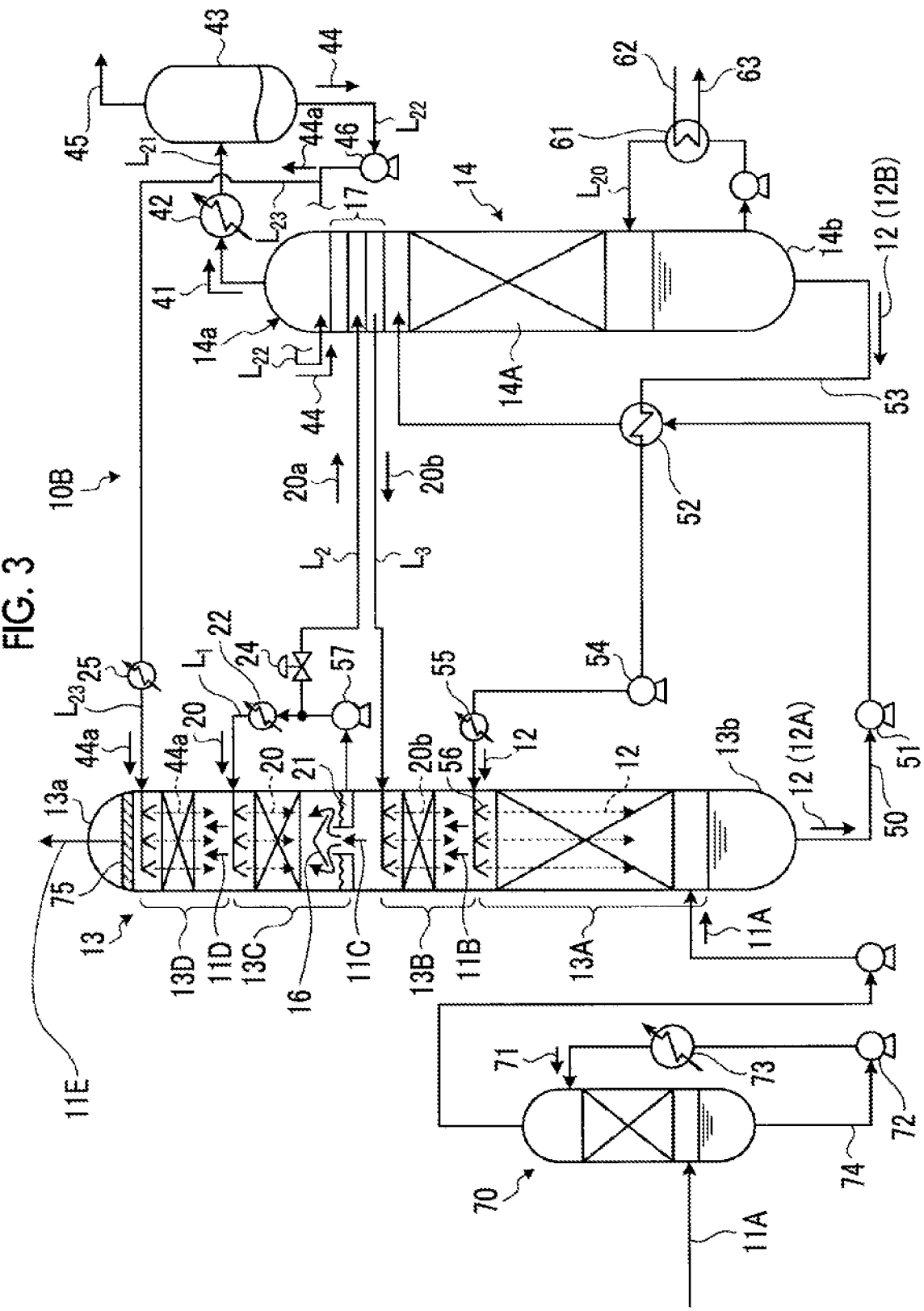
FIG. 3 is a schematic view of a $CO_2$ recovery device according to Embodiment 2.

A $CO_2$ recovery device according to another embodiment according to the invention will be described with reference to the drawings. FIG. 3 is a schematic view of the $CO_2$ recovery device according to Embodiment 2. In addition, the same components as those of the $CO_2$ recovery device 10A according to Embodiment 1 illustrated in FIG. 1 will be designated by the same reference signs, and the duplicate description thereof will be omitted. As illustrated in FIG. 3, a $CO_2$ recovery device 10B of the present embodiment further includes a deep rinse section 13D, which is provided on the gas flow downstream side (column upper stage side) of the main rinse section 13C, and performs deep rinsing with the rinse water supplied from the outside of the rinse section, in the $CO_2$ recovery device 10A illustrated in FIG. 1.

In the present embodiment, a branch line $L_{23}$, which supplies a portion 44a of the condensed water 44 separated out of the $CO_2$ gas 41 that has entrained the water vapor released from the column top part 14a of the regeneration column 14 to the outside, is connected to the deep rinse section 13D. Then, the portion 44a of the condensed water 44 is supplied by the branch line $L_{23}$, and is used as the rinse water in the deep rinse section 13D.

Additionally, a cooling section 25 may be provided in the branch line $L_{23}$ so as to cool the portion 44a of the condensed water 44 to a predetermined temperature (for example, 40° C. or lower).

The portion 44a of the condensed water 44 is separated out of the $CO_2$ gas 41 that has entrained the water vapor released from the regeneration column 14 to the outside. Hence, since the condensed water 44 is water with almost no entrainment of the $CO_2$ absorption liquid, the rinsing effects of the deep rinsing are exhibited.

Additionally, ion exchanged water may be separately provided as the deep rinse water in the deep rinse section 13D besides using the portion 44a of the condensed water 44.

In this way, in the present embodiment, a liquid with a low gas-entrained substance concentration, such as the $CO_2$ absorption liquid, is used as the deep rinse water, and is brought into gas-liquid contact with the flue gas 11D after $CO_2$ removal on a rearmost downstream side (column top part 13a side) on the final stage of the rinse section. Accordingly, the concentration of the $CO_2$ absorption liquid diffused from the column top part 13a of the absorption column 13 to the outside can be further reduced.

As a result, the concentration of basic amine compounds released while remaining in $CO_2$-removed flue gas 11E1 released to the outside can be further reduced compared to Embodiment 1.

Embodiment 3

Figure 4:
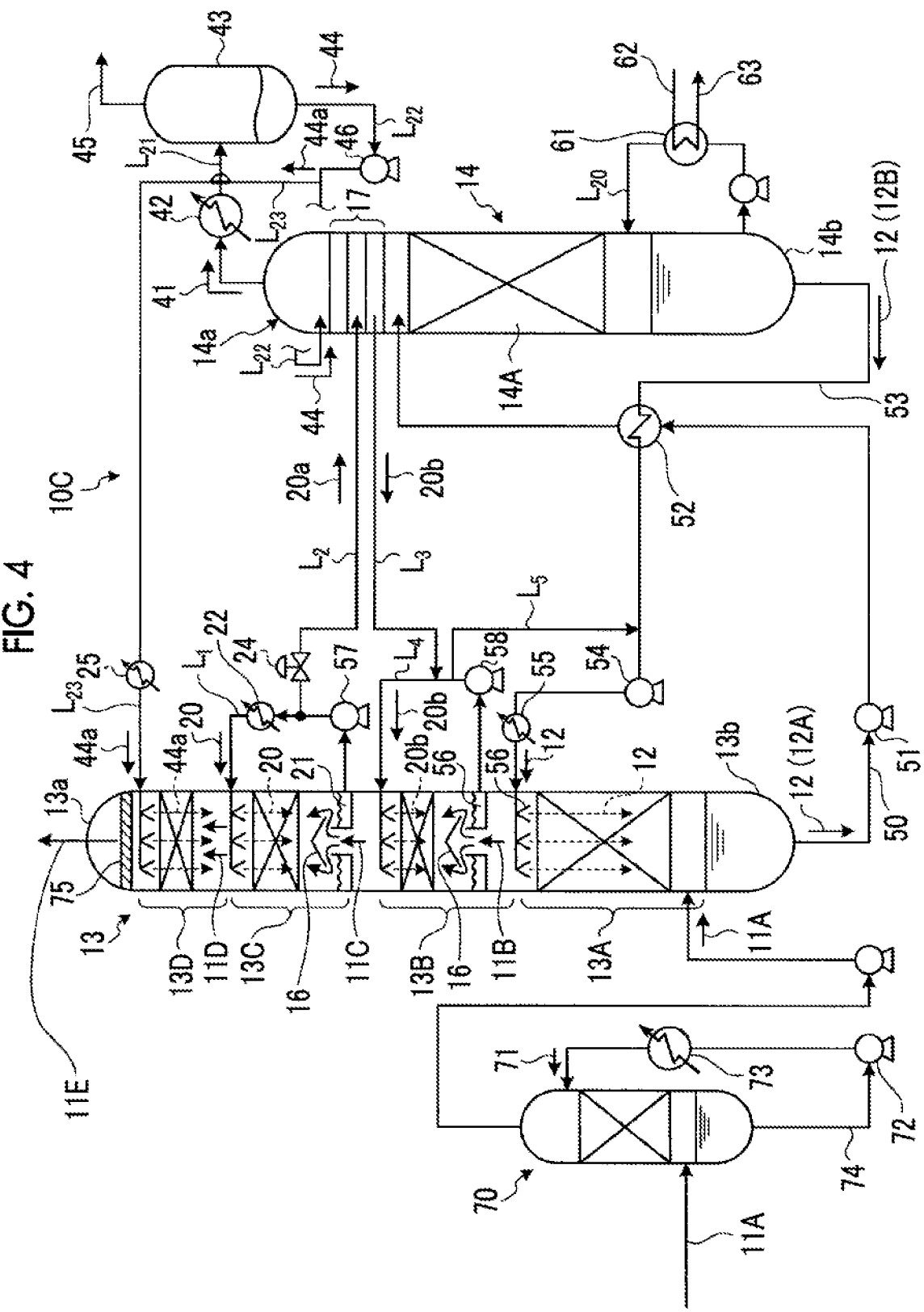
FIG. 4 is a schematic view of a $CO_2$ recovery device according to Embodiment 3.

A $CO_2$ recovery device according to still another embodiment according to the invention will be described with reference to the drawings. FIG. 4 is a schematic view of the $CO_2$ recovery device according to Embodiment 3. In addition, the same components as those of the $CO_2$ recovery devices 10A and 10B according to Embodiments 1 and 2 illustrated in FIGS. 1 and 3 will be designated by the same reference signs, and the duplicate description thereof will be omitted. As illustrated in FIG. 4, in a $CO_2$ recovery device 10C of the present embodiment, a pre-rinse water circulation line $L_4$ through which the pre-rinse water 20b circulates is installed in the pre-rinse section 13B, in the $CO_2$ recovery device 10B illustrated in FIG. 3. The pre-rinse water 20b stored in the liquid storage section 21 of the chimney tray 16 of the pre-rinse section 13B is introduced into the pre-rinse water circulation line $L_4$. Also, the pre-rinse water 20b is circulated by a circulation pump 58 provided in the pre-rinse water circulation line $L_4$. Therefore, in the pre-rinse section 13B of the present embodiment, the pre-rinse water 20b that falls in the liquid storage section 21 is recovered, and is circulated and reused in the pre-rinse water circulation line $L_4$.

Additionally, in the present embodiment, an end part of the refluxed water supply line $L_3$ that extracts a portion of the refluxed water is connected to the pre-rinse water circulation line $L_4$ such that the portion is introduce as the pre-rinse water 20b of the pre-rinse section 13B.

As a result, according to the present embodiment, efficient recovery of the absorbent resulting from the promotion of the diffusion of the absorbent from the mist based on higher temperature of the pre-rinse water 20b and lower concentration of the contained absorbent in the pre-rinse section 13B can be achieved, and the amount of diffusion of the absorbent entrained in the gases can be reduced.

Here, in the present embodiment, all of the pre-rinse water 20b is not dropped to the $CO_2$ absorption section 13A unlike Example 2. Thus, in order to maintain the liquid level of the liquid storage section 21 at a height in a certain range, surplus water is generated. For this reason, the present embodiment includes a pre-rinse water surplus extraction line $L_5$ that extracts a portion of the pre-rinse water 20b as the surplus water from the pre-rinse water circulation line $L_4$. An end part of the pre-rinse water surplus extraction line $L_5$ is connected to the lean solution supply pipe 53 that supplies the lean solution 12B. Accordingly, the extraction water obtained by extracting a portion of the pre-rinse water 20b joins the lean solution 12B so as to be introduced into the $CO_2$ absorption section 13A.

As a result, the surplus water extracted from the pre-rinse water surplus extraction line $L_5$, and supplied to the lean solution supply pipe 53 is uniformly mixed with the lean solution 12B. This mixed lean solution is then cooled by the cooling section 55 provided in the lean solution supply pipe 53, so that further efficient absorption of $CO_2$ in the $CO_2$ absorption section 13A can be achieved.

REFERENCE SIGNS LIST 10A to 10C: $CO_2$ RECOVERY DEVICE
11A: $CO_2$-CONTAINING FLUE GAS
12: $CO_2$ ABSORPTION LIQUID
12A: RICH SOLUTION
12B: LEAN SOLUTION
13: $CO_2$ ABSORPTION COLUMN (ABSORPTION COLUMN)
13A: $CO_2$ ABSORPTION SECTION
13B: PRE-RINSE SECTION
13C: MAIN RINSE SECTION
13D: DEEP RINSE SECTION
14: ABSORPTION LIQUID REGENERATION COLUMN (REGENERATION COLUMN)
20: RINSE WATER
20a: PORTION OF RINSE WATER
20b: PRE-RINSE WATER
$L_1$: RINSE WATER CIRCULATION LINE
$L_2$: RINSE SECTION EXTRACTION LIQUID SUPPLY LINE
$L_3$: REFLUXED WATER SUPPLY LINE
$L_4$: PRE-RINSE WATER CIRCULATION LINE
$L_5$: PRE-RINSE WATER SURPLUS EXTRACTION LINE

The invention claimed is:

1. A $CO_2$ recovery device comprising:
a $CO_2$ absorption column that removes a $CO_2$ gas by contacting a flue gas containing the $CO_2$ gas with a $CO_2$ absorption liquid,
the $CO_2$ absorption column including
a $CO_2$ absorption section that absorbs the $CO_2$ gas contained in the flue gas with the $CO_2$ absorption liquid,
a rinse section that is provided on a flue gas flow downstream side of the $CO_2$ absorption section, and cools the flue gas after the $CO_2$ gas removal with a first rinse water, and recovers an entrained $CO_2$ absorption liquid with the first rinse water;
an absorption liquid regeneration column that introduces the $CO_2$ absorption liquid that has absorbed the $CO_2$ gas in the $CO_2$ absorption column as a rich solution therefrom and regenerates the $CO_2$ absorption liquid in which the $CO_2$ gas is released from the rich solution as a lean solution,
the absorption liquid regeneration column including
a $CO_2$ release part that releases the $CO_2$ gas from the rich solution,
a reflux section that is provided on a $CO_2$ gas flow downstream side of the $CO_2$ release part, and mixes refluxed water generated by the $CO_2$ gas that has included a water vapor from the $CO_2$ release part of the regeneration column with a second rinse water,
wherein the $CO_2$ recovery device is configured to supply the rich solution via a rich solution supply line to the absorption liquid regeneration column and supply the lean solution via a lean solution supply line to the $CO_2$ absorption column to reuse the $CO_2$ absorption liquid therein, and
wherein the $CO_2$ recovery device further comprises a condensed water supply line that supplies condensed water from the water vapor included in the $CO_2$ gas which is released from a top column part of the absorption liquid regeneration column to the rinse section of the $CO_2$ absorption column as the first rinse water;
a rinse water circulation line that supplies and circulates the first rinse water containing the $CO_2$ absorption liquid, from a liquid storage section of the rinse section to a top part thereof;

a rinse section extraction liquid supply line that is configured to branch from the rinse water circulation line and is directly connected only to the reflux section of the absorption liquid regeneration column, and extracts the first rinse water that has been used at the rinse section and directly supplies the extracted first rinse water only to the reflux section of the absorption liquid regeneration column as the second rinse water.

2. The $CO_2$ recovery device according to claim 1, comprising:
   a separation drum that separates the condensed water from the water vapor included in the $CO_2$ gas which is released from the column top part of the absorption liquid regeneration column; and
   a condensed water line that is connected with the separation drum to introduce the condensed water to the reflux section of the absorption liquid regeneration column, wherein the condensed water supply line is branched from the condensed water line.

3. A $CO_2$ recovery method, using a $CO_2$ absorption column that removes $CO_2$ gas by contacting a flue gas containing a $CO_2$ gas with a $CO_2$ absorption liquid, and an absorption liquid regeneration column that regenerates the $CO_2$ absorption liquid as a lean solution in which the $CO_2$ gas is released from a rich solution, to reuse the $CO_2$ absorption liquid in the $CO_2$ absorption column, the method comprising:

supplying condensed water from water vapor included in the $CO_2$ gas which is released from a top column part of the absorption liquid regeneration column to a rinse section of the $CO_2$ absorption column;

cooling the flue gas after the $CO_2$ gas removal with a first rinse water, and recovering an entrained $CO_2$ absorption liquid with the first rinse water in the rinse section of the $CO_2$ absorption column;

extracting the first rinse water that has been used at the rinse section, and directly supplying the extracted first rinse water only to a reflux section of the absorption liquid regeneration column as a second rinse water.

\* \* \* \* \*